March 27, 1962     C. W. BUCKINGHAM     3,026,870

SURGICAL BONE PIN DRIVER

Filed April 21, 1958

INVENTOR.

CHARLES W. BUCKINGHAM

Charles W. Buckingham

United States Patent Office 3,026,870
Patented Mar. 27, 1962

3,026,870
SURGICAL BONE PIN DRIVER
Charles W. Buckingham, 3417 Park Ave.,
St. Louis 4, Mo.
Filed Apr. 21, 1958, Ser. No. 729,831
1 Claim. (Cl. 128—83)

This invention relates to surgical equipment and more particularly to apparatus for treating bones.

It is an object of the present invention to provide a manually operated surgical bone pin driver for inserting surgical pins into fractured bone structure without damaging such structure or irritating surrounding tissue.

Other objects of the invention are to provide a surgical bone pin driver bearing the above object in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
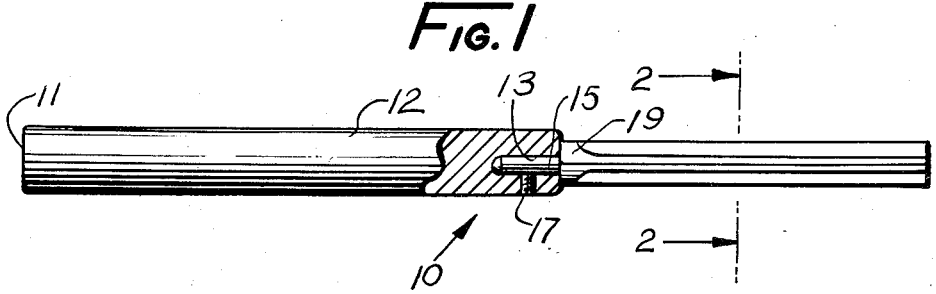
FIGURE 1 is a side elevational view, with parts broken away, of a surgical bone pin driver made in accordance with the present invention and having a bone pin assembled therewith.
Figure 2:
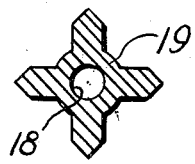
FIGURE 2 is an enlarged transverse cross sectional view taken along line 2—2 of FIGURE 1.
Figure 4:
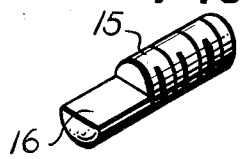
FIGURE 4 is an enlarged perspective view of an adapter forming a part of the pin driver shown in FIGURE 1.
Figure 3:
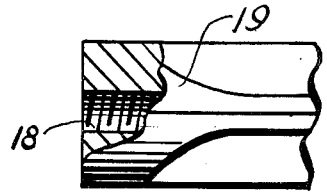
FIGURE 3 is an enlarged fragmentary side elevational view, with parts broken away, of certain parts of a surgical bone pin shown in FIGURE 1.

Referring now to the drawing, and more particularly to FIGURES 1 to 4 thereof, a surgical bone pin driver 10 made in accordance with the present invention is shown to include a cylindrical shank 12 having a striking end 11 and a longitudinal bore 13 extending partially into the opposite end. An adapter element in the form of a threaded stud 15 has a flat portion 16 formed at one end thereof for insertion into the bore 13 in the shank 12. A radially extending set screw 17 carried by the shank 12 releasably secures the adapter stud 15 within the bore 13.

In actual use of this pin driver 10, the adapter stud 15 is first secured within the shank 12 by tightening the set screw 17. The outwardly extending stud portion 15 is then threaded into the internally threaded bore 18 at one end of a fluted bone pin 19. By then striking the opposite end 11 of the shank 12, the bone pin 19 can be driven into the bone structure, following which it is only necessary to rotate the shank 12 to remove the stud 15 from threaded engagement with the pin, leaving the pin in position. In this way, no direct impact blows are imparted to the surgical pin, thus preventing any burrs, or the like from being formed. In addition, all blows are struck upon the shank 12 at a point quite remote from the bone structure, thus preventing accidental injury thereto.

While various changes may be made in the detail construction, it shall be understood that such changes shall be within the spirit and scope of the present invention as defined by the appended claim.

What I claim as new and desire to protect by Letters Patent of the United States is:

A surgical bone pin driver comprising in combination, a horizontal shank of cylindrical configuration having a circular, vertically disposed flat striking surface at its head end and a vertically disposed flat annular working surface at the working end thereof, a bone pin adapter stud, said bone pin adapter stud having a cylindrical portion extending for substantially one half its length adjacent one end thereof and embodying a threaded exterior surface, the opposite end of said bone pin adapter stud having a semi-cylindrical portion extending for substantially one half its length adjacent the opposite end thereof, said semi-cylindrical portion embodying a smooth longitudinal semi-cylindrical surface in longitudinal alignment with the said threaded exterior surface of said cylindrical portion and a flat smooth rectangular shaped engaging surface portion directly opposite said semi-cylindrical surface portion and in longitudinal alignment with the central longitudinal axis of said shank, a longitudinal cylindrical bore extending within said shank a distance substantially equal to one-half the length of said bone pin adapter stud and in from said annular surface in said working end thereof and aligned with the central axis of said shank, a threaded transverse bore formed in said working end of said cylindrical shank joining said longitudinal bore therein with the exterior surface thereof, and a radially inwardly extending set screw carried by said threaded transverse bore for contacting said flat surface portion of said adapter stud preventing rotation of said stud within said transverse bore and momentarily securing said pin adapter stud within said longitudinal bore in said cylindrical shank while said shank is being used as a bone pin driver.

References Cited in the file of this patent
UNITED STATES PATENTS
2,187,852    Friddle _____ Jan. 23, 1940

OTHER REFERENCES
Zimmer Fracture Equipment, 1954. (Page 115 relied on. Copy in Division 55.)
"Deputy Fracture Appliances and Their Application," 1943 (pages 49 and 50 relied on), copy in Div. 55.